Oct. 9, 1962    M. F. GERHAUSER    3,057,128
SEALED PACKET AND METHOD FOR MAKING SAME
Filed Oct. 17, 1958
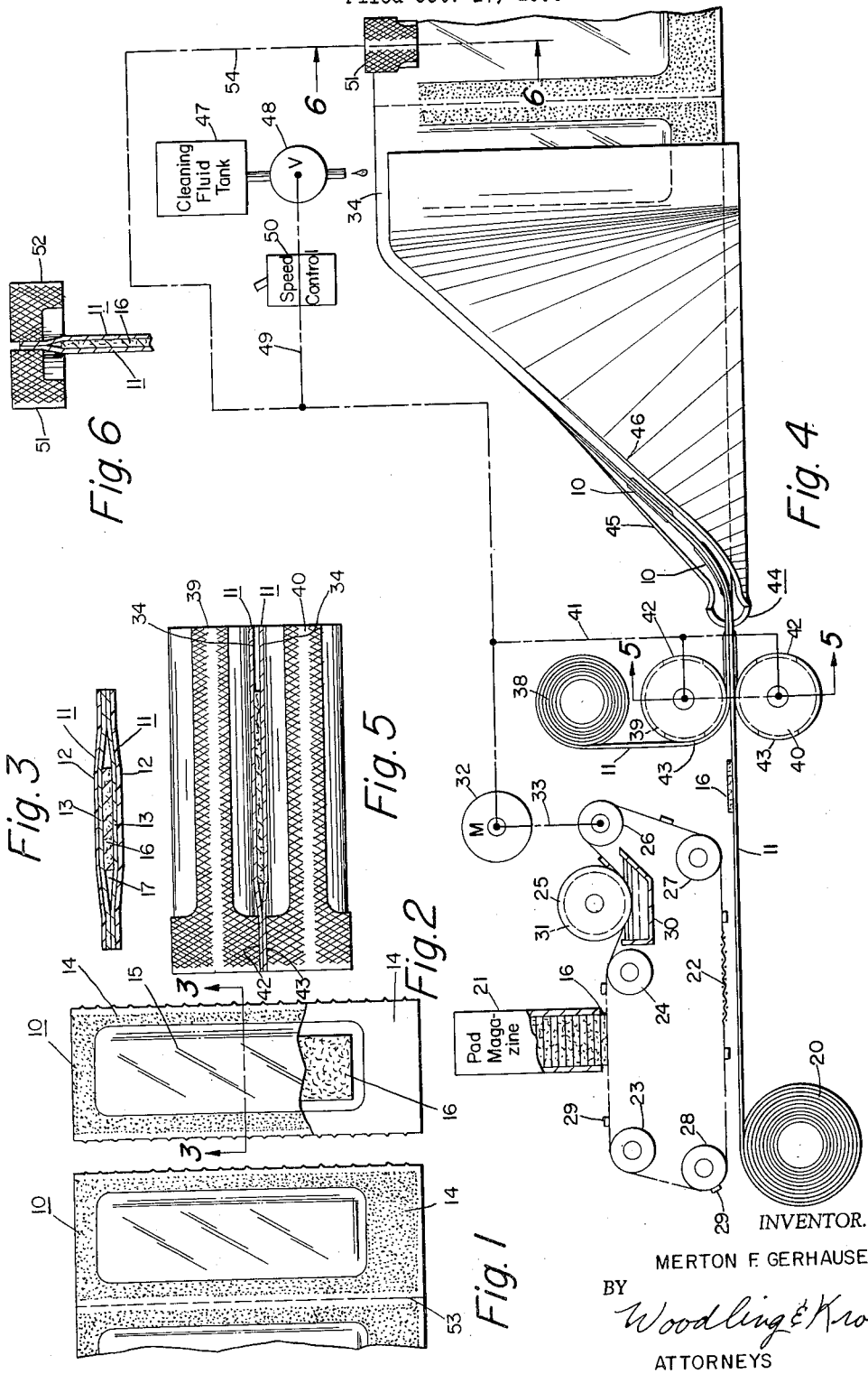
INVENTOR.
MERTON F. GERHAUSER
BY Woodling & Krost
ATTORNEYS

United States Patent Office 3,057,128
Patented Oct. 9, 1962

3,057,128
SEALED PACKET AND METHOD FOR MAKING SAME
Merton F. Gerhauser, 2996 Montgomery Ave., Cleveland 22, Ohio
Filed Oct. 17, 1958, Ser. No. 767,798
1 Claim. (Cl. 53—28)

The invention relates to sealed packets and more particularly to sealed packets and methods for making same which have enclosed therein a saturable pad supplied with an extra amount of cleaning fluid, in order that a complete cleaning job may be done without running out of cleaning fluid.

It has been found that prior art packets of the class described are deficient, in that there is an insufficient amount of cleaning fluid in the sealed packet to do an adequate and satisfactory cleaning job before the cleaning fluid evaporated.

An object of the invention is to provide an extra amount of cleaning fluid in the sealed packet, so that the cleaning pad remains moist throughout the entire cleaning operation.

Another object of the invention is the provision of a sealed packet having enclosed therein a pad and cleaning fluid; the fluid being in excess of an amount which may be saturable by the cleaning pad.

Another object of the invention is the method of making a sealed packet, the steps of which include the making of a packet chamber with an open end and adding fluid to the chamber through the open end before completely sealing the packet.

Another object of the invention is the method of making a sealed packet, the steps of which include the provision of enclosing a pad moistened with cleaning fluid in a packet chamber with an open end, and adding extra fluid to the chamber through the open end before completely sealing the packet.

Other objects and a fuller understanding of the invention may be had by referring to the following description and claim, taken in conjunction with the accompanying drawing, in which:

FIGURE 1 is a plan view of laminated strips employed to make the sealed packets;

FIGURE 2 is a plan view of a sealed packet after it has been severed from the laminated strips, the lower part being broken away to show the pad;

FIGURE 3 is a cross-sectional view taken along the line 3—3 of FIGURE 2 with the thickness of the laminated strips greatly enlarged;

FIGURE 4 is a diagramatic illustration of a machine for making the sealed packets;

FIGURE 5 is a cross-sectional view taken along the line 5—5 of the sealing rolls in FIGURE 4; and FIGURE 6 is a cross-sectional view taken along the line 5—5 of FIGURE 4, showing sealing rolls for finally sealing the packet.

With reference to FIGURES 1, 2 and 3, the sealed packet is indicated by the reference character 10 and is formed by two laminating strips 11 which have face-to-face surfaces. Each of the face-to-face surfaces of the laminating strips comprise a peripheral area portion 14 and an intermediate area portion 15. The face-to-face surfaces of the intermediate area portion 15 are spaced apart and define a chamber 17. The face-to-face portions of the peripheral areas portion 14 are sealed to render the chamber 17 fluid tight. Mounted within the chamber 17 is a felt pad 16. The laminating strips 11 each comprise a plastic sheet 12 and a metal foil 13. The plastic sheet 12 is very thin, in the order of a few thousandths of an inch. Similarly, the metal foil is very thin, in the order of a few thousandths of an inch. The plastic sheet 12 and the metal foil 13 are bonded together. The plastic sheet reinforces the metal foil and thereby protects the metal foil.

The FIGURE 4 is a diagrammatic illustration for a machine for making the sealed packets. In FIGURE 4, the reference character 20 represents a supply roll of a laminating strip. Located above the supply roll 20 is an endless screen 22 which travels around a series of rolls 23, 24, 25, 26, 27 and 28. The screen is driven by the roll 26, which in turn is operated by a motor 32 through any suitable mechanical drive means as indicated by the dash-dot line 33. A plurality of spaced ejector blocks 29 are mounted on the endless screen 22. Mounted above the endless screen 22, between the two rolls 23 and 24, is a magazine 21 for holding a supply of pads 16. The ejector blocks 29, as they pass under the magazine 21, eject a pad therefrom. The screen 22 carries the pad into a cleaning fluid reservoir 30 under the roll 25. The roll 25 has a groove 31 to receive the ejector blocks 29 so that they may clear the roll 25 as they pass thereunder. As the felt pad is immersed in the cleaning fluid of the reservoir 30, it becomes completely saturated with cleaning fluid. The endless screen 22 continues to carry the saturated felt pad under the roll 25, and then over and around the roll 26 where upon it falls upon the traveling laminated strip 11. The saturated felt pad 16 is then caused to pass between two sealing rolls 39 and 40 which are driven by any suitable mechanical drive connection such as illustrated by the dash-dot line 41 from the motor 32. A second supply roll 38 supplies a laminating strip 11 around the sealing roll 39 and above the laminating strip 11 which carries the saturated pad 16. As the two laminating strips 11, with the saturated pad 16 therebetween, pass between the sealing rolls 39 and 40, the peripheral area portion 14 of the face-to-face surfaces of the two laminating strips 11 are partially sealed, leaving the end indicated by the reference character 34 open, see FIGURE 5. The sealing rolls 39 and 40 have sealing lands 42 and 43 which partially seal the peripheral portion of the face-to-face laminating strips 11. That is to say, the two side edges and the bottom edge of the peripheral portion 14 are sealed with the top edge left open. Also, the sealing lands 42 and 43 are provided with provisions for making a perforated cut 53 between the packets, see FIGURE 1.

As the two laminating strips 11, with the pad therebetween, leave the sealing rolls 39 and 40, they pass through a U shaped shield 44 having sides 45 and 46 for twisting the laminating strip 11 so that the opened end 34 is on top, whereby an extra amount of cleaning fluid may be introduced into the chamber 17. Any suitable means may be employed for adding an additional amount of cleaning fluid in the chamber 17, and as illustrated, I provide a cleaning fluid tank 47 which has a metering valve 48 driven by the motor 32 by any suitable means such as indicated by the dash-dot line 49 and a speed control 50. The speed of the valve is so regulated that an extra amount of cleaning fluid is added to the chamber in order that an adequate cleaning job may be done in one complete application of the sealed packet. After the extra cleaning fluid has been added to the chamber 17, the packets then pass between final sealing rolls 51 and 52 which seal the end 34 to thereby render the chamber 17 completely sealed. The rolls 51 and 52 may be driven by the motor 32 by any suitable drive connection as indicated by the dash-dot line 54.

The operation of the machine in FIGURE 4 may be altered by omitting the operation of saturating the felt pads 16 as they pass through the cleaning fluid reservoir 30. In other words, the machine in this alternate plan of operation may not have any cleaning fluid in the reservoir 30, which means that the felt pads 16 would be delivered to the traveling laminating strip 11 without being saturated with cleaning fluid. With this alternate method of operation, all of the cleaning fluid would be introduced into the chamber 17 from the tank 47 by speeding up the metering valve 48 by changing the speed setting of the speed control 50. Otherwise, the operation of the alternate method is the same as that previously described.

The felt pad which I preferably employ in this invention, is Type 18R1, 100% Virgin Wool White Felt. This is the classification which is given to the felt pad by the Felt Association Standards for Mechanical Rolled Felts, as adopted by the Society of Automotive Engineers under ASTM Test Methods. The size of the felt pad is preferably 7/16 of an inch wide, 2 inches long, and 1/16 of an inch thick.

With a sealed packet in accordance with this invention, the fluid in the sealed packet is in excess of the amount which may be saturable by said pad 16. In this invention, the preferable excess amount is at least 50% greater than that which may be saturable by said pad. This may be illustrated by the following information. The average weight per felt pad with full fluid saturation is 1.372 grams, and the weight of individual pad dry is .285 gram. Thus, the weight of fluid in each saturated pad is 1.087 grams. Thus, the amount of fluid which may be saturable by the pad is 1.087 grams. By adding an extra amount as provided by the present invention, the average weight of cleaning fluid per unit may be 1.717 grams. This is evolved as follows: The average weight per finished packet is 2.473 grams. The average weight per felt pad dry is .285 gram. The average weight per laminating strips is .471 gram. This shows that the weight of the cleaning fluid in each sealed packet is 1.717 grams. The difference between 1.717 grams and 1.087 grams, is .630 gram which is the excess amount of fluid added to each packet. In other words, the fluid in excess of the amount which may be saturable by said pad is .630 gram, and this represents substantially 60 percent increase in the amount of fluid over that saturable by said pad means. The percentage of increase may be as much as 100 percent, although an increase of about 60 percent appears to be adequate.

In using the sealed packet, the operator preferably tears the upper half of the packet off, thus leaving the upper end of the pad exposed, with the bottom end of the pad immersed in the extra cleaning fluid. The cleaning operation is done by rubbing the upper exposed end of the felt pad against the spot which is supposed to be cleaned. The bottom half of the fluid chamber holds the excess liquid so that the excess cleaning fluid is carried up the pad by wick action or capillary attraction and keeps the upper end of the felt pad moist throughout the complete cleaning operation.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

Process for making a sealed metal chamber packet comprising the steps of providing first and second laminated pieces of metal foil means and plastic sheet means with said metail foil means being exposable on one side thereof and said plastic sheet means being exposable on the other side thereof, said metal foil means of each said laminated pieces having a peripheral area portion and an intermediate area portion, providing saturable pad means, arranging said first laminated piece of metal foil means and plastic sheet means in a substantially horizontal plane with an exposed work surface of said metal foil means thereof facing upward, saturating said pad means by dipping same in a supply of cleaning fluid which is readily evaporable, depositing said saturated pad on the intermediate area portion of said exposed upper work surface of said metal foil means, arranging said second laminated piece of metal foil means and plastic sheet means in a substantially horizontal plane with an exposed work surface of said metal foil means thereof facing downwardly and directly above the saturated pad on the exposed upper work surface of said first metal foil means in face-to-face relationship with the exposed work surface of said metal foil means of said first laminated piece, partially sealing said saturated pad means between said intermediate area portions by pressing a major part of said peripheral area portion of said face-to-face metal foil means directly against each other in a horizontal plane to produce a partially sealed metal chamber packet with an open area portion, repositioning said partially sealed metal chamber packet from a horizontal plane to substantially vertical plane with said open area portion uppermost, adding extra cleaning fluid to said metal chamber packet through said open area portion in an amount not exceeding two times that absorbed by said pad means, completely sealing said metal chamber packet by pressing said metal foil means of said open area portion against each other to produce a completely sealed metal chamber packet.

References Cited in the file of this patent

UNITED STATES PATENTS

| | | |
|---|---|---|
| 1,259,964 | Davis | Mar. 19, 1918 |
| 2,102,858 | Schlumbohm | Dec. 21, 1937 |
| 2,402,981 | Beal et al. | July 2, 1946 |
| 2,565,887 | Salfisberg | Aug. 28, 1951 |
| 2,606,412 | Salfisberg | Aug. 12, 1952 |
| 2,750,075 | Land et al. | June 12, 1956 |
| 2,828,590 | Swartz | Apr. 1, 1958 |
| 2,894,322 | Clair | July 14, 1959 |